July 24, 1928.
P. KINNEAR
ICE CREAM HOLDER
Filed May 31, 1923
1,678,436
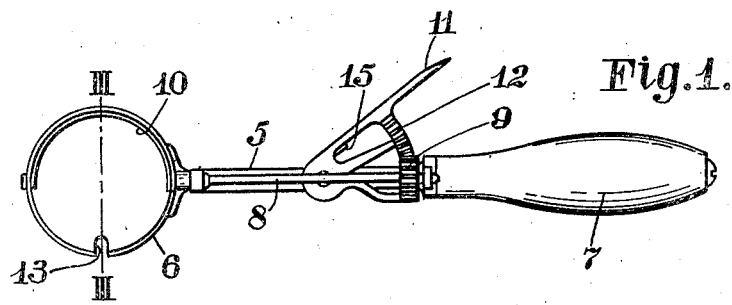
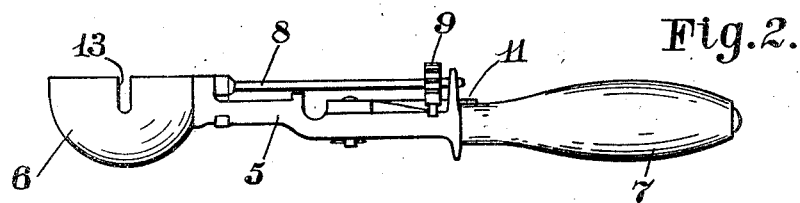
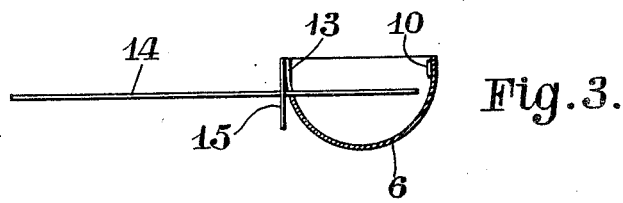
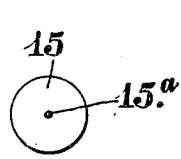
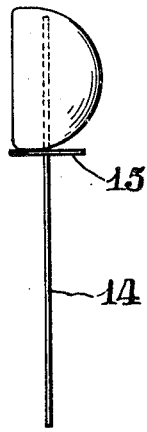
Inventor
PETER KINNEAR
his Attorneys Patented July 24, 1928.

1,678,436

UNITED STATES PATENT OFFICE.

PETER KINNEAR, OF COLUMBUS, OHIO.

ICE-CREAM HOLDER.

Application filed May 31, 1923. Serial No. 642,500.

The principal object of this invention is to provide a holder for a cake of ice cream, said holder consisting of a stick provided with a guard so that the cream may be conveniently eaten from the stick without smearing the fingers. Other objects will appear from the following disclosure.

The invention is embodied in the example herein shown and described, the features of novelty being finally claimed.

In using my invention I first form the cake of ice cream by means of an improved form of dipper which I have shown and described in an application for patent filed June 19, 1922, S. No. 569,333, and to show how the cake is formed for receiving the stick I illustrate the dipper.

In the accompanying drawing—

Figure 1 is a plan view of an ordinary ice cream dipper as modified for use in connection with the present invention.

Fig. 2 is a side view of the same.

Fig. 3 is a sectional view on the line III—III Fig. 1 showing a stick in position when shoved into a dipper of cream.

Fig. 4 illustrates the cake of cream as removed by the stick from the dipper.

Fig. 5 is a plan view of the disk guard.

In the views 5 designates the main stem of the dipper which has at one end a hemispherical cup or bowl 6 and at the other a handle 7. Mounted longitudinally to rotate parallel to this main stem 5 is a shaft 8 provided at one end with a spur gear 9 and at the other with a semi-circular scraper 10 adapted to be rocked around the interior of the bowl to release the frozen cream from the bowl. Pivoted on the main stem 5 is a thumb lever 11 provided with an arcuate rack 12 to engage the spur gear 9 to rock the scraper when the lever is oscillated. The lever is provided with a spring 15 to hold it outward so that the scraper shall normally lie at one side of the bowl flush with its opening. The construction thus generally described is that of a dipper in common use except that the provision of the deep slot shown at 13 in that edge of the dipper opposite that where the scraper normally lies and standing about midway between the axis of motion of the scraper.

After filling the bowl of the dipper with frozen cream I shove the stick as shown at 14 equipped with the guard 15 into the cream and then turn the scraper to free both the stick and the cream from the bowl it appearing when removed as shown in Fig. 4. The disk 15 is a piece of card board, stiff paper or other suitable material and is originally provided with a perforation 15$^a$ of smaller diameter than that of the stick so that when the stick is thrust through the hole the disk will be held where placed by friction. The disk can be located on the stick at a point to determine the extent of the insertion of the stick into the cream and so that the inserted end of the stick shall not interfere with the operation of the scraper. The disk serves principally to prevent the flow of the cream down the stick while held in the hand for eating the cream.

In preparing the cake of cream any surplus thereof in the dipper will preferably be smoothed off at the open side of the bowl and the resultant hemisphere can if demanded, be dipped in an appropriate solution of chocolate after which it may be covered with an attractive wrapper and put away in a freezer to keep it hard and ready for sale and consumption.

The forms of the parts can be somewhat modified without departing from the gist of the invention as claimed.

What I claim is:

A device for holding a cake of ice cream comprising, in combination, a stick having a substantially uniform diameter and a closed guard thereon extending transversely therefrom and therearound, said guard being of flexible material and frictionally engaged with the stick at a perforation in said guard, said perforation being primarily of smaller diameter than the diameter of the stick whereby said guard can be adjusted to stand by frictional engagement at any point on the stick.

PETER KINNEAR.